US008081880B2

(12) United States Patent
Papernyi

(10) Patent No.: US 8,081,880 B2
(45) Date of Patent: Dec. 20, 2011

(54) INLINE PUMP SHARING ARCHITECTURE FOR REMOTELY-PUMPED PRE- AND POST-AMPLIFIERS

(75) Inventor: Serguei Papernyi, Pointe-Claire (CA)

(73) Assignee: MPB Communications Inc., Montréal, Québec (CA)

( * ) Notice: Subject to any disclaimer, the term of this patent is extended or adjusted under 35 U.S.C. 154(b) by 983 days.

(21) Appl. No.: 11/960,003

(22) Filed: Dec. 19, 2007

(65) Prior Publication Data
US 2008/0152352 A1 Jun. 26, 2008

Related U.S. Application Data

(60) Provisional application No. 60/871,178, filed on Dec. 21, 2006, provisional application No. 60/871,586, filed on Dec. 22, 2006.

(51) Int. Cl.
*H04B 10/00* (2006.01)
(52) U.S. Cl. ............... 398/157; 398/135; 398/136
(58) Field of Classification Search ............ 398/37, 398/92, 157, 160; 359/134, 160
See application file for complete search history.

(56) References Cited

U.S. PATENT DOCUMENTS

| | | | |
|---|---|---|---|
| 4,823,096 A * | 4/1989 | Hash | 333/109 |
| 5,452,124 A * | 9/1995 | Baker | 359/341.2 |
| 5,748,363 A * | 5/1998 | Duck et al. | 359/341.1 |
| 6,239,903 B1 * | 5/2001 | Islam et al. | 359/337 |
| 6,711,359 B1 * | 3/2004 | Duff et al. | 398/178 |
| 7,068,945 B2 * | 6/2006 | Ogiwara et al. | 398/173 |
| 2002/0097481 A1 * | 7/2002 | Du et al. | 359/334 |
| 2006/0209394 A1 * | 9/2006 | Papernyi et al. | 359/341.33 |

FOREIGN PATENT DOCUMENTS
WO   WO 2006/034562   *   4/2006

OTHER PUBLICATIONS

Francois Boubal et al., "Recent Unrepeatered WDM 10 Gbit/s Experiments in the Range 300 Km to 450 Km" Suboptic2001, Kyoto, Paper P3.6.
S.B. Papernyi et al., "Third-Order Cascaded Raman Amplification". MPB Communications Inc.; OFC2002, Anaheim, postdeadline paper FB4.
L. Labrunie et al., "500km WDM 12×10 Gbit/s CRZ Repeaterless Transmission Using Second Order Remote Amplification," Electronic Letters, vol. 39, No. 19, pp. 1394-1395, 2003.
Vladimir Karpov et al., "Cascaded pump delivery for remotely pumped Erbium doped amplifiers," Suboptic2004, Paper We.8.8. A Rx ROPA.
C.R.S. Fludger et al., "Inline loopbacks for improved OSNR and reduced double Rayleigh Scattering in distributed Raman Amplifiers," presented at OFC 2001, in Baltimore, MD, USA, paper MI1-1.

* cited by examiner

*Primary Examiner* — Nathan M Curs
*Assistant Examiner* — Tanya Ngo
(74) *Attorney, Agent, or Firm* — Anglehart et al.

(57) ABSTRACT

A new transmission link configuration with remote Er post- and pre-amplifiers where pump power is shared between a pair of fibers carrying traffic in opposite directions is proposed. A budget increase of >4 dB is demonstrated.

17 Claims, 2 Drawing Sheets

INLINE PUMP SHARING ARCHITECTURE FOR REMOTELY-PUMPED PRE- AND POST-AMPLIFIERS

FIELD OF THE INVENTION

This invention relates to remotely optically pumped amplifiers (ROPA) used in optical fiber transmission links.

BACKGROUND OF THE INVENTION

The longest unrepeatered links utilize a remotely-pumped Er post-amplifier (Tx ROPA), located ~30-70 km from the transmit terminal, in addition to a remote pre-amplifier (Rx ROPA), typically positioned ~100-140 km from the receive terminal. Pumping of the ROPAs can be accomplished either by directly launching high power at ~1480 nm (first-order pumping) or through the generation of 1480-nm pump power inside the transmission fiber (or dedicated pump-delivery fibers) via high-order cascaded Raman processes as described in the following articles: F. Boubal, J-P. Blondel, E. Brandon, L. Buet, V. Havard, L. Labrunie, P. Le Roux, "Recent unrepeatered WDM 10 Gbit/s experiments in the range 300 km to 450 km," Suboptic 2001, Kyoto, Paper P3.6., S. Papernyi, V. Karpov, W. Clements, "Third-Order Cascaded Raman Amplification," OFC2002, Anaheim, postdeadline paper FB4., L. Labrunie, F. Boubal, P. Le Roux, E. Brandon, "500 km WDM 12×10 Gbit/s CRZ repeaterless transmission using second order remote amplification," Electronic Letters, Vol 39, No 19, pp 1394-1395, 2003., V. Karpov, S. Papernyi, V. Ivanov, W. Clements, T. Araki, Y. Koyano, "Cascaded pump delivery for remotely pumped Erbium doped amplifiers," Suboptic 2004, Paper We.8.8. A Rx ROPA can be pumped through the transmission fiber and/or dedicated delivery fibers. On the other hand, in the case of Tx ROPAs, the transmission fiber cannot be used for pump delivery since Raman interactions between the high pump power and the co-propagating signals would cause excess noise generation and limit the pump power delivered to the ROPA. As a result, all systems with a Tx ROPA have to date utilized one or two pump sources with each connected to a dedicated pump-delivery fiber. Although utilizing two dedicated fibers and Tx ROPA pump sources allows optical budget increases of ~9-12 dB, the improvement comes at the expense of a substantial increase in system cost and complexity as mentioned in the above-cited articles by, Labrunie et al, and Karpov et al.

SUMMARY OF THE INVENTION

According to some embodiments of the invention, there is provided a new transmission link configuration with remote Er post- and pre-amplifiers where pump power is shared between a pair of fibers carrying traffic in opposite directions is proposed.

According to some embodiments of the invention, the new Tx+Rx ROPA link architecture can potentially provide up to 5 dB of budget improvement compared to the best achievable with a Rx ROPA alone, but does not require dedicated delivery fibers nor dedicated Tx ROPA pump sources. The concept applies to the most common type of link, one consisting of a pair of fibers carrying traffic in opposite directions, and is based on the idea of power sharing between the two fibers carrying traffic "West" and "East". In the paper by C. R. S Fludger, V. Handerek, N. Jolley, R. J. Mears, titled "Inline loopbacks for improved OSNR and reduced double Rayleigh Scattering in distributed Raman Amplifiers," presented at OFC 2001, in Baltimore, Md., USA, paper MI1-1., the application of a power sharing concept for providing distributed Raman amplification was theoretically explored. However, the principle was not experimentally investigated and, in fact, our detailed calculations have shown that using power sharing for distributed Raman amplification cannot provide any significant budget improvement. On the other hand, we will show that when applied to the remote pumping of Er amplifiers, it provides a cost-effective means of realizing substantial budget increases.

BRIEF DESCRIPTION OF THE DRAWINGS

The invention will be better understood by way of the following detailed description of embodiments of the invention with reference to the appended drawings, in which.

DETAILED DESCRIPTION OF THE INVENTION

Figure 1:
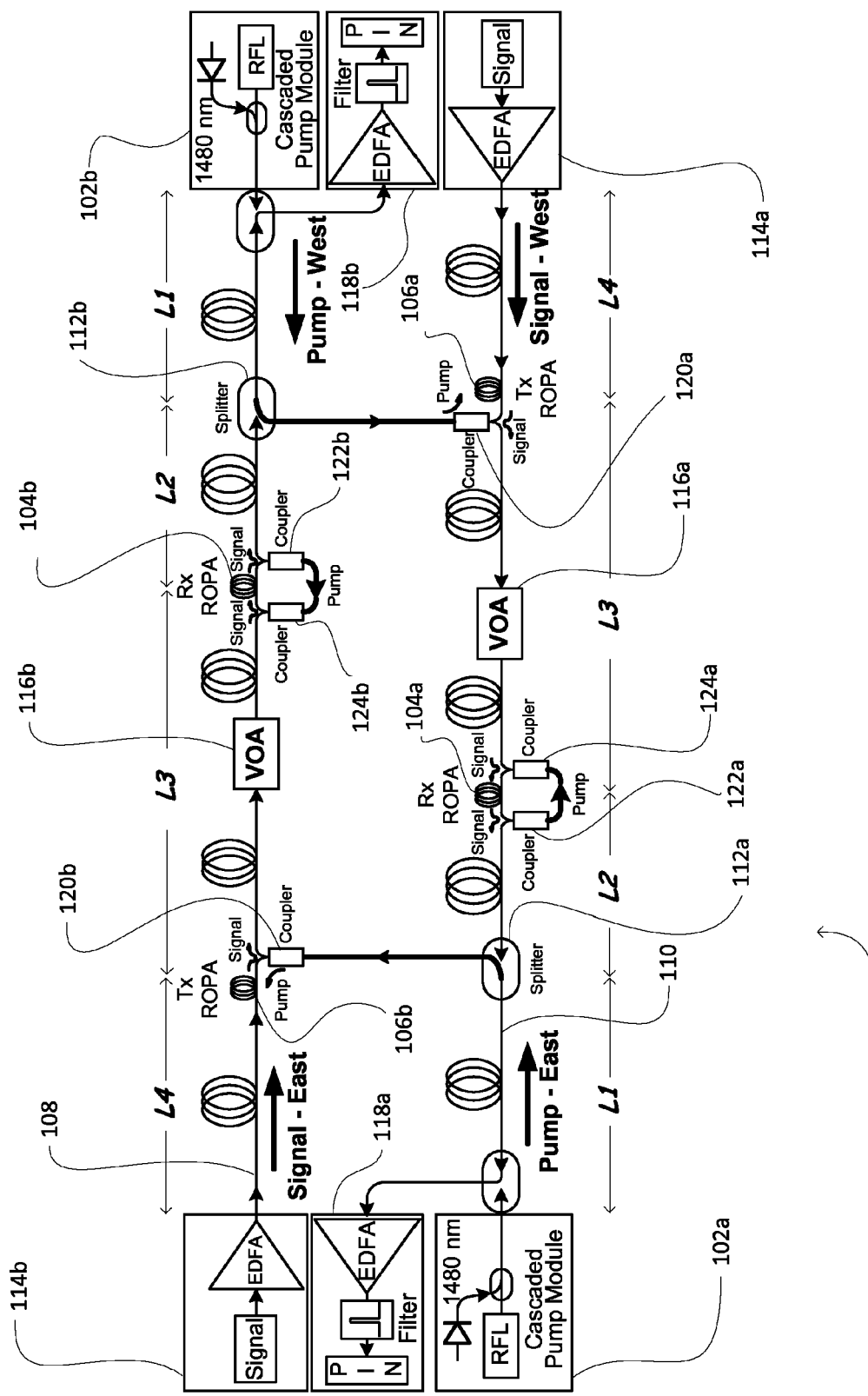
FIG. 1 is a schematic diagram of the transmission link layout according to one embodiment.

The power sharing concept is illustrated in the experimental set-up 100 shown in FIG. 1. Part of the pump power travelling "East" towards a Rx ROPA 104a (amplifying signals travelling "West") is split off at the location of a Tx ROPA 106b in the fiber carrying data "East" 108 and used for pumping the Tx ROPA 106b. The splitting of the pump light can be by power splitting at the single or at all pump wavelengths, or can be by WDM splitting, the latter being desirable when, for example, the Tx ROPA 106b would be pumped by different wavelengths than the Rx ROPA 104a. Thus, the "West-East" transmission fiber 110 is used for pump delivery to the "East-West" Tx ROPA 106b (and vice versa) and therefore, co-propagating Raman interactions are eliminated. The link consists of four fiber lengths: L1, the distance from the pump source 102a (receiver side) to a point where part of the pump power is split between fibers (S-point) 112a; L2, the distance from the S-point 112a to the Rx ROPA 104a; L3, the distance between the Tx and Rx ROPAs (106a and 104a); and L4=L1 the distance from the transmitter 114a to the Tx ROPA 106a (i.e. the total link length L=L1+L2+L3+L4).

The conditions for maximum link length are that L4+L1+L2 be as large as possible consistent with the requirements that: 1) the pump power reaching the Tx ROPA 106b be sufficient to ensure the signal output power is at the limit ($P_{nl}$) imposed by nonlinear effects and 2) the pump power reaching the Rx ROPA 104a be sufficient for optimal gain and noise figure performance of the amplifier 104a. Obviously, for a given fiber loss, the maximum distance between ROPA (104a or 106b) and pump launch point 102a increases with increasing launch power. However, the maximum value of the pump power that can be launched ($P_0$) is limited by pump depletion by Raman noise amplification and ultimately by random spike generation induced by high Raman gain.

For first-order pumping, the optimal lengths L4+L1+L2 can be calculated starting from the following equation for the pump power delivered to the Rx ROPA 104a:

$$P_{Rx} = \left[ P_0 e^{-\alpha_p L1} - \frac{P_{nl}}{\eta} \right] e^{-\alpha_p L2} \quad (1)$$

where $P_{Rx}$ is the delivered pump power required at the Rx ROPA 104a for optimal gain and noise figure performance of the amplifier 104a, $\alpha_p$ is the fiber loss at the pump wavelength and $\eta$ is the efficiency of the Tx ROPA 106a. It is fair to assume that $P_0$, $P_{Rx}$ and $P_{nl}$ as well as the distance L3 should be constants for a particular fiber type and signal modulation format.

Under these assumptions, the optimal location of the Tx ROPA ($L1_{opt}$) 106b that provides the longest link can be derived from equation (1):

$$L1_{opt} = \left( \frac{1}{\alpha_p} \right) \times \ln\left( \eta \times \frac{P_0}{2P_{nl}} \right) \quad (2)$$

From (1) and (2) we find that, for first-order pumping, the optimum split ratio is 50/50%. The maximum budget improvement (not accounting for any nonlinear penalties introduced by the Tx ROPA 106b compared to the best achievable with a Rx ROPA 104a alone is given by:

$$\Delta B = \alpha_S[(2L1_{opt}+L2+L3)-(L3_R+L5)] = \alpha_S \times L1_{opt} \quad (3)$$

where $\alpha_s$ is the fiber loss at the signal wavelength and $L3_R$ and L5 are the optimal distances from the transmitter 114a to the Rx ROPA 104a and from the Rx ROPA 104a to the receiver 118a (pump laser 102a) for the case of no Tx ROPA 106b. Under our assumptions, it is clear that $L3=L3_R$ and $L5=(1/\alpha_p) \times \ln(P_0/P_{Rx})$.

Figure 2:
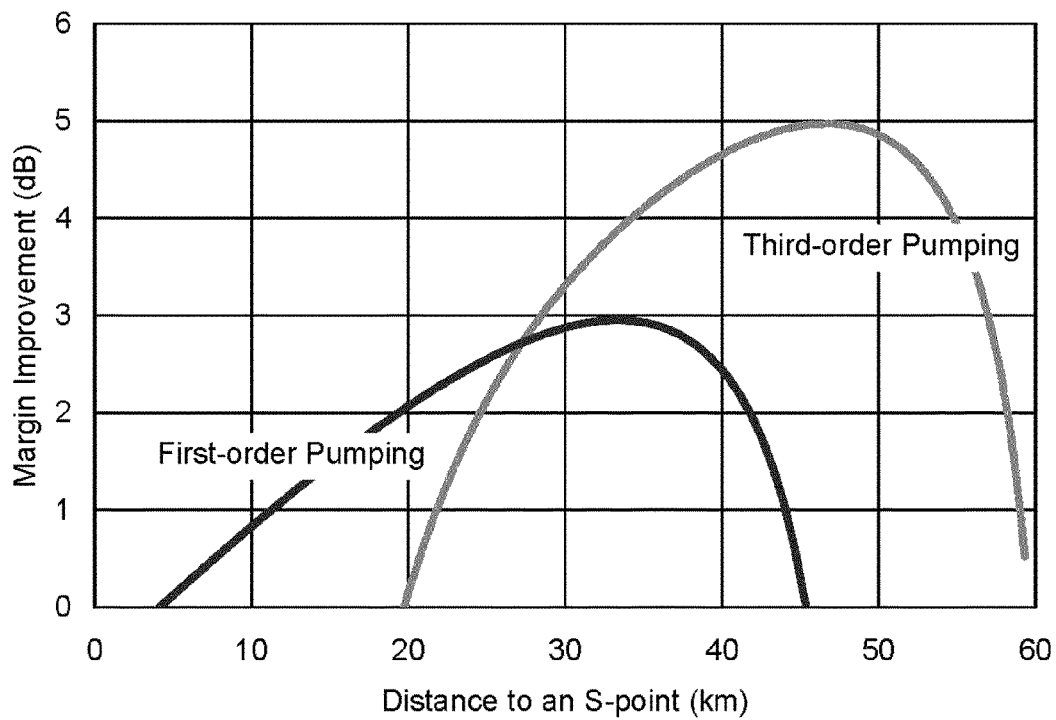
FIG. 2 is a graph of calculated budget improvements, over the best achievable with a Rx ROPA alone, as a function of the distance of the Tx ROPA from the near end terminal for First- and Third-Order ROPA Pumping according to the invention.

FIG. 2 illustrates the estimated budget improvement vs. the distance from the pump source 102a to the S-point 112a for both first- and third-order pumping for a realistic Tx ROPA 106b efficiency of 65% and a fiber with parameters close to those of pure silica core fiber (i.e. $\alpha_s$=0.17 dB/km and $\alpha_p$=0.2 dB/km). For third-order pumping, it not possible to calculate the budget improvement in a closed form and the curve shown in FIG. 2 is the result of numerical modeling. The numerically calculated improvement was found to be ~2 dB greater than that for first-order pumping because the 1480-nm pump power achieves its maximum value ~25 km from the launch point and the "effective" 1480-nm launch power is ~2 dB higher.

Transmission Experiment

A transmission experiment was carried out in Corning Vascade EX1000 fiber with average losses of 0.169 dB/km at 1552 nm and 0.195 dB/km at 1485 nm (these values include splice and connector losses averaged through the fiber length). A single 2.5 GHz signal, appropriately dithered for stimulated Brillouin scattering suppression, was amplified in an Er-doped booster amplifier having a saturated output power up to 21 dBm. It was found that the nonlinear limit for the signal launch power $P_{nl}$ was 20 dBm. A third-order cascaded Raman pump scheme was used for ROPA pumping. The pump source consisted of a 1276-nm high-power Raman laser with a maximum output power of 4 W, plus a seed LD at 1485 nm with a power output up to 100 mW. Two fiber Bragg gratings, reflecting incoming Raman ASE at 1360 nm and 1427 nm back into the span were spliced between the Raman laser and the entrance of the transmission link to provide feedback for the build-up of the first- and second-order Stokes powers out in the span.

Two tests were carried out with the setup shown in FIG. 1. In the first test, the distance to the S-points 112a and 112b (Tx ROPAs 106b and 106a) was 35.75 km, in the second it was increased to 50.75 km. The split ratio in the first case was 30/70% with 30% of the power used for pumping the Tx ROPAs 106b and 106a and 70% propagating on towards the Rx ROPAs 104a and 104b. In the second test, the split ratio was 60/40% with the 60% being used for Tx ROPA (106b and 106a) pumping. In order to keep the Rx ROPA (104a and 104b) pumping constant in both tests, the fiber length from the S-points (112a and 112b) to the Rx ROPAs (104a and 104b) was changed from 89 km to 63 km. In both tests, the pump power delivered to each ROPA was the same: 135 mW for the Tx ROPAs (106a and 106b) and 6.6 mW for the Rx ROPAs (104a and 104b). These values were found to be optimal and provided a Tx ROPA (106a and 106b) efficiency of 63% (including losses in WDMs and isolators) and a Rx ROPA (104a and 104b) gain of 18 dB and noise figure of 5.6 dB. A VOA (116a and 116b) located between the Tx and Rx ROPAs (106a and 104a; 106b and 104b) was used for changing the total link losses.

It will be appreciated that the illustration in FIG. 1 is schematic and details are not shown. For example, the pump light can be coupled 120b into the active fiber of the Tx ROPA 106b to be counter-propagating with respect to the transmission signals. This provides maximum amplification near the output of the ROPA that can be near the nonlinear power limit of the transmission fiber. Likewise, at the Rx ROPA 104a, pump light can be coupled out 122a of the receive fiber and into 124a the active fiber of the Rx ROPA to be co-propagating with respect to the incoming signals. This provides for the maximum gain at the beginning of the Rx ROPA, thus optimizing the noise performance of the Rx ROPA.

A direct comparison with the "Rx ROPA alone" 104a configuration was made by simply taking out the Tx ROPA 106a and the splitter 112a, reconnecting the link and appropriately adjusting the VOA settings. Of course, the losses in the pump-power WDM 120a were taken into account when calculating the total link budget.

Figure 3:
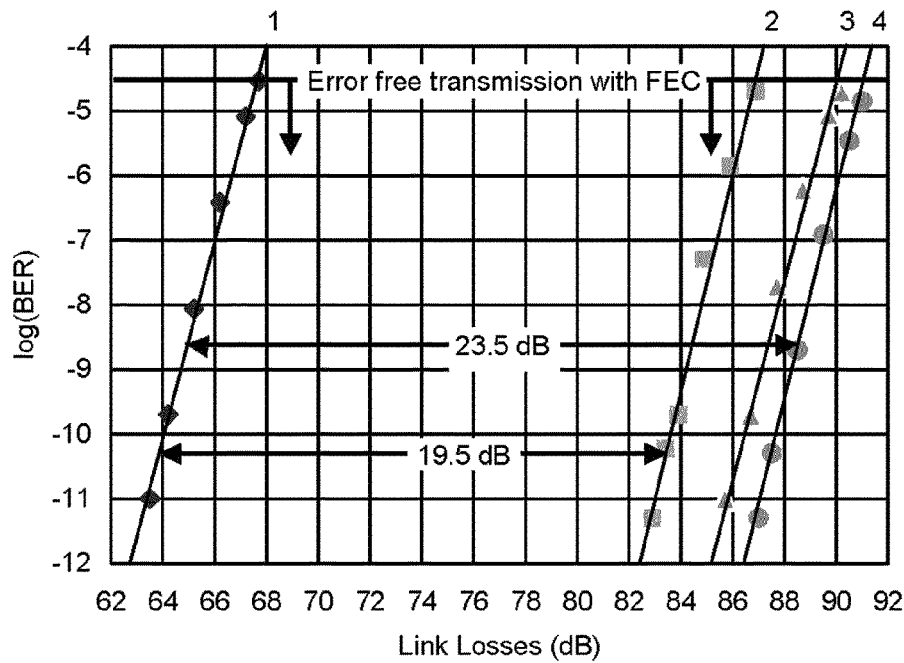
FIG. 3 is a plot of BER measurements vs. link losses in which reference 1 is for the case without ROPAs, 2 is the case with only a Rx ROPA located at the optimal position, and 3,4 are for the cases with an added Tx ROPA placed at 35.75 and 50.75 km from the pump source, respectively.

As can be seen in FIG. 3, the addition of the Tx ROPAs and pump power sharing between the pair of fibers (108 and 110) provides up to 4 dB of margin improvement for a total link loss of ~90 dB. The measured improvement values are approximately 1 dB smaller than predicted. This could be attributed to a nonlinear penalty caused by the Tx ROPA. In other words, the nonlinear limit of the Tx ROPA output power was found to be ~19.3 dBm as compared to the $P_{nl}$ of 20 dBm at the booster output when the link did not include the Tx ROPAs (though we do not have a clear explanation for this fact).

In conclusion, we have proposed and demonstrated a new link configuration that allows a budget increase >4 dB with only one ROPA pump source per transmission fiber and no dedicated pump delivery fibers.

What is claimed is:

1. An optical fiber communications link having a pair of fibers carrying signals in opposite directions, a pair of remotely optically pumped amplifiers (ROPA) namely, a transmit ROPA and a receive ROPA, located proximal to each end of said pair of fibers carrying signals in opposite directions, and a system to deliver pump power to said pair of remotely optically pumped amplifiers (ROPA) at each end of said pair of fibers comprising:

a pump module for injecting light into said second fiber at said one end;

a WDM splitter, located in said second fiber at a distance from said one end corresponding to the position of the Tx ROPA in said first fiber, for WDM splitting off a portion of the ROPA pump power provided by said injected light, with the remaining pump light continuing on in said second fiber to pump an active fiber of said Rx ROPA spliced into said second fiber and a portion of said pump power is provided to said Tx ROPA, said portion of said pump power provided to said Tx ROPA having a different wavelength than a remaining portion of said pump power provided to said Rx ROPA and wherein said WDM splitter is adapted to allow signal passage in a signal transmission direction of said second fiber;

a coupler to couple said portion of said ROPA pump power into an active fiber of said Tx ROPA;

wherein, said Tx ROPA in said first fiber and said Rx ROPA in said second fiber are pumped from said pump module located at said one end, without the use of dedicated pump delivery fibers and without co-propagating Raman interactions between the signals and said injected light.

2. The optical fiber communications link of claim 1, wherein said pump module injects light at wavelength $\lambda_o$, said wavelength $\lambda_o$ of said injected light is equal to the pump wavelength $\lambda_p$ of the active fiber of said Tx and Rx ROPAs.

3. The optical fiber communications link of claim 1, wherein said pump module injects light at wavelength $\lambda_o$, said wavelength $\lambda_o$ of said injected light is shorter than the ROPA pump wavelength $\lambda_p$ by n Raman shifts in the second fiber and said pump module further comprises a fiber Bragg grating reflector or a seed laser diode at the final ROPA pump wavelength $\lambda_p$ and in the vicinity of each intermediate wavelength $\lambda_l$ where I=n–1, n–2 . . . 1, and denotes the number of Raman shifts in the transmission fiber between the wavelength $\lambda_l$ and $\lambda_p$, and wherein the high power at the ROPA pump wavelength $\lambda_p$ is generated via $n^{th}$-order cascaded Raman processes in said second fiber.

4. The optical fiber communications link of claim 1, wherein pump light is coupled into said active fiber of said Tx ROPA to be counter-propagating with respect to a signal transmission direction of said first fiber.

5. The optical fiber communications link of claim 1, wherein, at said Rx ROPA, pump light is coupled out of said second fiber and into said active fiber of said Rx ROPA to be co-propagating with respect to said signal transmission direction of said second fiber.

6. The optical fiber communications link of claim 3, wherein pump light is coupled into said active fiber of said Tx ROPA to be counter-propagating with respect to a signal transmission direction of said first fiber.

7. The optical fiber communications link of claim 3, wherein, at said Rx ROPA, pump light is coupled out of said second fiber and into said active fiber of said Rx ROPA to be co-propagating with respect to said signal transmission direction of said second fiber.

8. An optical fiber communications link having a plurality of optical fibers, the link comprising:

a first optical fiber in said optical fiber communications link carrying optical signals in a first direction, said first optical fiber having a transmit remotely pumped optical amplifier (Tx ROPA) at a distance L4 from a signal transmit end of said first optical fiber, and a receive remotely pumped optical amplifier (Rx ROPA) at a distance L1+L2 from a signal receive end of said first optical fiber;

a second optical fiber in said optical fiber communications link carrying optical signals in a second direction that is opposite to the first direction, said second optical fiber having a transmit remotely pumped optical amplifier (Tx ROPA) at substantially a distance L4 from a signal transmit end of said second optical fiber, and a receive remotely pumped optical amplifier (Rx ROPA) at substantially a distance L1+L2 from a signal receive end of said second optical fiber;

a first pump module injecting pump power into said first fiber at said signal receive end of said first fiber;

a second pump module injecting pump power into said second fiber at said signal receive end of said second fiber;

a first coupler coupling pump power into said Tx ROPA of said first optical fiber;

a second coupler coupling pump power into said Tx ROPA of said second fiber;

a first splitter located in said first fiber at said L1 distance from said signal receive end of the first optical fiber, said first splitter providing a portion of pump power from said first pump module to said second coupler and a remaining portion of pump power from said first pump module to travel in said first fiber to said Rx ROPA of said first optical fiber;

a second splitter located in said second fiber at substantially said L1 distance from said signal receive end of said second fiber, said second splitter providing a portion of pump power from said second pump module into said first coupler and a remaining portion of pump power to travel in said second fiber to said Rx ROPA of said second optical fiber;

wherein said L1 distance is substantially the same as said L4 distance, and said L1, L2 and L4 distances are selected for obtaining a desired gain and noise figure in said span.

9. The communications link of claim 8 wherein said first splitter is chosen to split less than 70% of said pump power out of said first fiber to direct it to pump said Tx ROPA of said second fiber and to allow the remaining more than 30% of said pump power to continue in said first fiber to be delivered to said Rx ROPA of said first fiber.

10. The communications link of claim 8 wherein said second splitter is chosen to split less than 70% of said pump power out of said second fiber to direct it to pump said Tx ROPA of said first fiber and to allow the remaining more than 30% of said pump power to continue in said second fiber to be delivered to said Rx ROPA of said second fiber.

11. The communications link of claim 8 wherein said first and second couplers are arranged to couple pump power in a signal counter-propagating direction so as to provide maximum amplification near the output end of said Tx ROPAs of said first and second fibers that can be near the nonlinear power limit of said signal transmission in said first and second fibers.

12. The communications link of claim 8 further comprising a first pair of couplers for coupling pump power at said Rx ROPA of said first fiber in a co-propagating direction with said signals by coupling pump power out of said first fiber and coupling the pump power back into said first fiber at a signal input end of said Rx ROPA, thus improving noise performance of said Rx ROPA of said first fiber.

13. The communications link of claim 8 further comprising a second pair of couplers for coupling pump power at said Rx ROPA of said second fiber in a co-propagating direction with said signals by coupling pump power out of said second fiber and coupling the pump power back into said second fiber at a signal input end of said Rx ROPA, thus improving noise performance of said Rx ROPA of said second fiber.

14. The communications link of claim 8 wherein the magnitude of the pump power reaching each of said Rx ROPAs and said distances L1 and L2 are in a relationship that approximately corresponds to the following equation:

$$P_{Rx} = \left[P_0 e^{-\alpha_p L1} - \frac{P_{nl}}{\eta}\right] e^{-\alpha_p L2}$$

where $P_{Rx}$ is indicative of a value of the pump power reaching each of said Rx ROPAs, $P_0$ is indicative of a value of said pump power, $P_{nl}$ is indicative of a value of a signal output power of each of said Tx ROPAs, $\alpha_p$ is indicative of a value of a fiber loss at a pump wavelength, $\eta$ is indicative of a value of an efficiency of each of said Tx ROPAs, L1 is indicative of a value of said L1 distance and L2 is indicative of a value of said L2 distance.

15. The communications link of claim 8 wherein an optimal value of said L1 distance that provides a longest link and said pump power are in a relationship that approximately corresponds to the following equation:

$$L1_{opt} = \left(\frac{1}{\alpha_p}\right) \times \ln\left(\eta \times \frac{P_0}{2P_{nl}}\right)$$

where $P_0$ is indicative of a value of said pump power, $P_{nl}$, is indicative of a value of a signal output power of said Tx ROPA of said second fiber substantially equal to the limit imposed by nonlinear effects in said second fiber, $\alpha_p$ is indicative of a value of a fiber loss at a pump wavelength, $\eta$ is indicative of a value of an efficiency of said Tx ROPA of said second fiber, L1 is indicative of a value of said L1 distance.

16. The optical fiber communications link of claim 8, wherein said first pump module injects light at wavelength $\lambda_6$ said wavelength $\lambda_0$ of said injected light is equal to the pump wavelength $\lambda_p$ of an active fiber of said Tx ROPA of said second optical fiber and of an active fiber of said Rx ROPA of said first optical fiber.

17. The optical fiber communications link of claim 8, wherein said first pump module injects light at wavelength $\lambda_0$, said wavelength $\lambda_0$ of said injected light is shorter than the ROPA pump wavelength $\lambda_p$ by n Raman shifts in the first fiber and said first pump module further comprises a first fiber Bragg grating reflector or a first seed laser diode at the final ROPA pump wavelength $\lambda_p$ and in the vicinity of each intermediate wavelength $\lambda_I$, where I=n−1, n−2 . . . 1, and denotes the number of Raman shifts in the first fiber between the wavelength $\lambda_I$ and $\lambda_p$, and wherein the high power at the ROPA pump wavelength $\lambda_p$ is generated via $n^{th}$-order cascaded Raman processes in said first fiber.

* * * * *